United States Patent [19]

Butturini et al.

[11] Patent Number: 5,536,929
[45] Date of Patent: Jul. 16, 1996

[54] BAR CODE DETECTING CIRCUITRY

[75] Inventors: Randal S. Butturini, Ithaca; Ernest W. Cooley, Rochester, both of N.Y.

[73] Assignee: Johnson & Johnson Clinical Diagnostics, Inc., Rochester, N.Y.

[21] Appl. No.: 444,088

[22] Filed: May 18, 1995

Related U.S. Application Data

[62] Division of Ser. No. 959,208, Oct. 9, 1992, Pat. No. 5,461,223.

[51] Int. Cl.⁶ .................................................. G06K 7/10
[52] U.S. Cl. .................................. 235/462; 235/463
[58] Field of Search ................................ 235/462, 463; 327/14

[56] References Cited

U.S. PATENT DOCUMENTS

| | | | |
|---|---|---|---|
| 2,975,367 | 3/1961 | Adams et al. | 327/14 |
| 3,931,580 | 1/1976 | Hebda | 327/14 |
| 3,969,612 | 7/1976 | McJohnson | 235/462 |
| 4,000,397 | 12/1976 | Herbert et al. | 235/462 |
| 4,337,434 | 6/1982 | Fogel | 327/14 |

*Primary Examiner*—Harold Pitts
*Attorney, Agent, or Firm*—Dana M. Schmidt

[57] ABSTRACT

A wide bandwidth slope detector has a comparator with first and second time constant circuits coupled to first and second inputs thereof. Where one time constant is on the order of three times the other, the comparator will change state in response to the slopes of an input analog signal coupled to the time constant circuit. Feedback can be provided by a fixed resistor or by a tracking circuit. A smoothing or clipping circuit can be used to pre-process the input analog signals to eliminate noise therefrom. A bar code reading system combines first and second clipping circuits to smooth the highs and lows of the input signal, coupled to a slope detector. The tracking circuit can be used to provide a symmetrical hysteresis characteristic.

8 Claims, 11 Drawing Sheets

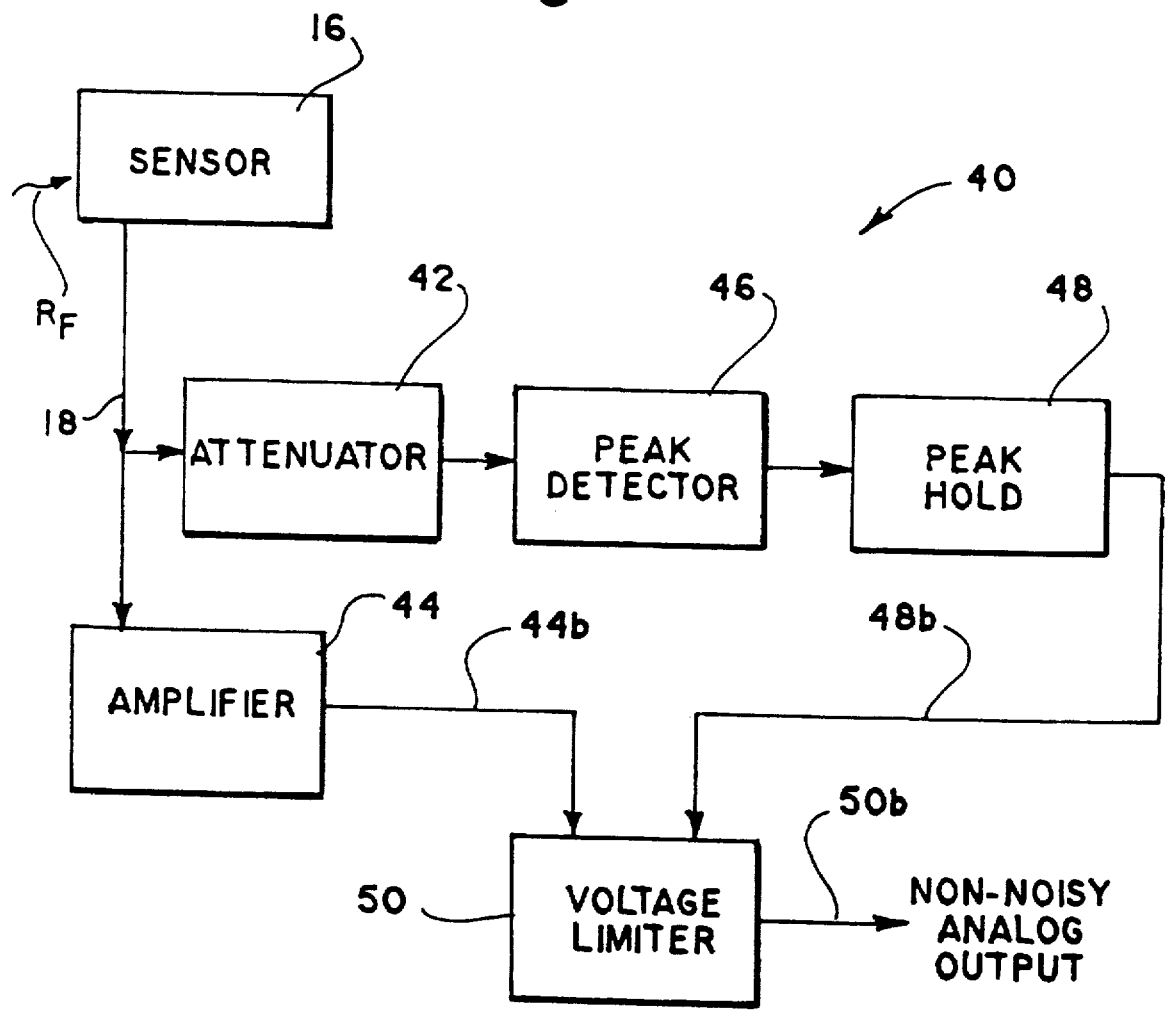

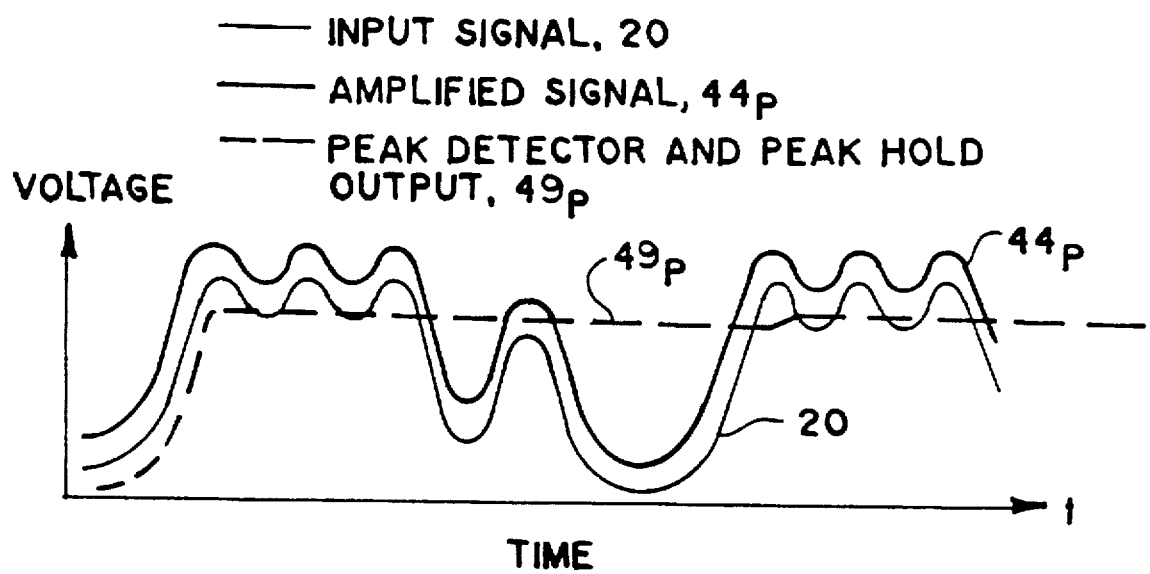
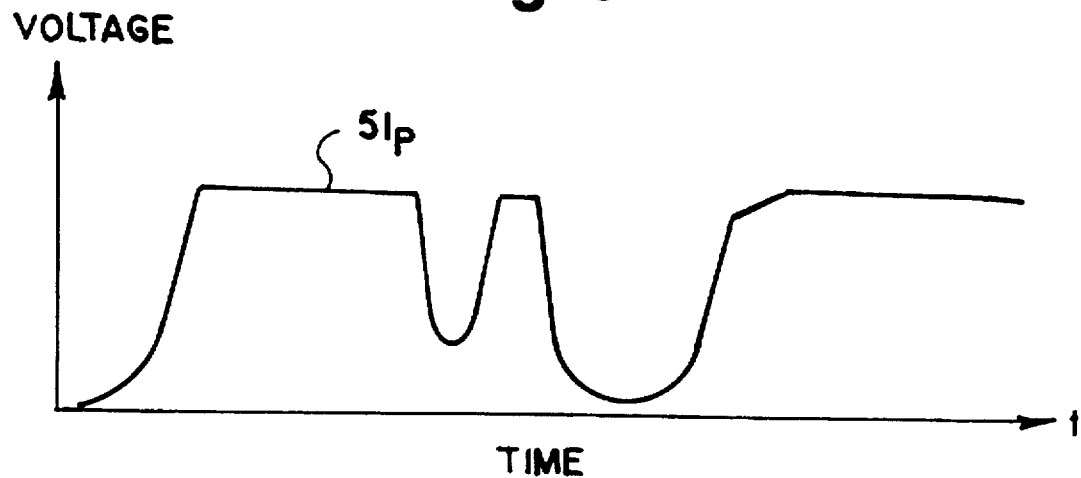

BAR CODE DETECTING CIRCUITRY

This is a Divisional of application U.S. Ser. No. 07/959,208, filed Oct. 9, 1992 U.S. Pat. No. 5,461,223 issued Oct. 24, 1995.

FIELD OF THE INVENTION

The invention pertains to circuitry for detecting bar codes carried on a medium and for generating binary representations thereof. More particularly, the invention pertains to circuits which smooth or clip peak values of a bar code modulated analog signal and which detect slopes therein.

BACKGROUND OF THE INVENTION

The use of bar codes to identify products, documents, or other media, or to specify characteristics thereof, has become very common. Bar codes can improve the speed and accuracy of information transfer. Unfortunately, the increase in bar code use has led to difficulties in read accuracy and reliability.

In known read systems, a source is usually used to generate a beam of radiant energy which is directed onto the bar code, usually by moving a bar coded medium through a read station. A photodetector is used to detect radiant energy reflected off of the moving bar code.

The photodetector produces a bar code modulated analog signal in response to reflected radiant energy. The modulated analog signal, which can have high and low amplitudes corresponding to the bar and space elements of the bar code, is then converted to a binary representation of the bar coded information.

FIG. 1 illustrates a medium M which carries a bar code B previously applied thereto. The bar code B can be detected and converted to a binary representation thereof by means of a known read system 10.

The system 10 includes a source of radiant energy 12. The source 12 is used to generate a beam of radiant energy $R_I$, which could be monochromatic, and to direct that beam $R_I$ onto a predetermined region of a read area.

As the medium M and associated bar code B move in a direction 14 past the predefined region, the radiant energy $R_I$ is reflected by the elements of the bar code B, thereby forming a modulated, reflected beam of radiant energy $R_f$. The beam $R_f$ is directed to a radiant energy sensor 16. The sensor 16 could be a photodiode, for example, a phototransistor, or other photo-sensitive device.

Output from the sensor 16 on a conductor or a line 18 is a modulated, analog, electrical signal 20 which is representative of the elements of the bar code B. The analog signal 20 is coupled to a discriminator circuit 22. Known discriminator circuits include amplitude comparators, as well as various types of differentiators.

The output signal from the discriminator circuit 22 on a line 24, which might be, for example, a bi-valued voltage, +V and −V, is a representation of the modulated analog signal 26. The signal 26 could be coupled to a converter 28 for purposes of generating a digitized representation 30 of the modulated analog signal 20 at logic voltage levels.

One problem associated with bar code reading circuitry is noise, which can cause false "ones" or "zeros" in the binary output stream. Noise can be due to variations in the quality of the bar code, as well as the configuration of the read circuitry.

In many applications, inexpensive printers are used to create bar codes on surfaces with some degree of roughness. The printer may print bars with a significant degree of Element Reflectance Nonuniformity (ERN), as defined in ANSI Standard X3.182-1990, or reflectance variation across an element. Sensitive detectors may interpret the nonuniformity as additional bar or space elements, thus misreading the code.

A granular surface onto which the codes are printed may contribute to ERN by differentially reflecting more or less light onto the detector. A nonuniform absorption of the printing into the surface material can also contribute to ERN.

Another problem associated with known bar code reading circuits is inaccuracy caused by limited dynamic range of the read circuitry. As a result, that circuitry is unable to discriminate relatively high frequency bar coded elements. This in turn imposes limitations on the velocity at which the bar coded medium M can move through the read station, as well as the range of velocity variations of the medium M that can be tolerated by the read circuitry.

Often, the bar and space element speed is high enough that the detector attenuates the amplitude of the narrow and higher frequency elements relative to the wide elements. This effect is defined as modulation in the ANSI Specification X3.192-1990 "Bar Code Print Quality-Guideline".

Modulation of the bar coded signal may occur when bandwidth-limited sensors are employed in bar code readers. This effect leads to elements with the same logical value, one or zero, but with differing amplitudes as the code is scanned.

Wide elements typically have a lower frequency content than do the narrow elements, and thus, would possess higher amplitudes in the bandwidth limited systems. The convolution of an aperture and wide or narrow bar code elements may also contribute to higher amplitudes for wide elements relative to narrow elements.

The rate at which the bar and space elements of a bar code symbol are sensed represents a set of frequencies to which the detector must be responsive. As the elements are sensed at higher and higher speeds, the frequency response requirements of the detector increases.

The ERN of the wide elements is detectable as signal changes within a bar code element. The modulation effects are detectable as changes in amplitude between portions of the signal representative of the same logical value. FIG. 2 is a graphical example of ERN and modulation present on the modulated analog signal 20 of FIG. 1.

In the waveform 20, the ERN noise 20a, while illustrated in connection with positive peak analog values, is also present on negative peak values. Similarly, the modulation effects reduce both positive peak values, such as 20b, and increases negative peak values (not shown.)

In addition to the effects of bandwidth-limited sensors, modulation of a bar code may be created in other ways. For a given aperture size of a sensor, there is a minimum element width which will generate a maximum signal. Bar or space elements which are narrower than this minimum will allow reflected light from adjoining elements to "leak" onto the detector, reducing the signal amplitude.

A third method by which signal modulation may occur is by tilting a non-symmetric (i.e., rectangular) aperture with respect to the bar and space element edges. The combination of a tilted aperture across bar code element edges results in a reduced amplitude for narrow bars and spaces relative to wide bar and space amplitudes.

As seen in FIG. 2, the modulation need not be symmetrically placed with respect to wide bars and spaces. Bar code edge detectors utilizing threshold crossing or peak detection techniques are at times not capable of decoding signals with the modulation shown in FIG. 2 with the desired accuracy and reliability.

Circuits which differentiate the signal are theoretically capable of identifying each positive and negative peak where the first derivative of the input signal goes to zero. Although the output of this type of circuit is independent of the absolute signal amplitude, a differentiator is very sensitive to any high frequency noise which may be present or the signal. Hence, ERN noise can produce false "one" or "zero" pulses.

Additionally, modulation effects can modify the sensor waveform to the point that traditional element edge determination techniques do not function adequately.

The use of hysteresis produced by positive feedback in comparator circuits may also limit the dynamic range of bar code speeds. Large amounts of positive feedback-will tend to limit the ability of a system to detect low amplitude signals, such as those generated by low bandwidth systems when exposed to high speed bar codes. At very low bar code speeds, where an unchanging input signal exists for a significant amount of time, the low hysteresis levels needed for high speed operation may not be adequate in the presence of electronic noise and the input offset voltage inherent in comparators.

Therefore, a bar code digitizing circuit must reconcile several conflicting performance requirements in order to accurately and reliably interpret an incoming waveform. This waveform may consist of high or low frequency constituents, ERN, modulation, overall amplitude variations, acceleration, or other undesirable modifiers to the bar coded signal.

Thus, there continues to be a need for accurate, noise insensitive read circuity with substantial bandwidth. Preferably, such circuitry will be inexpensive and readily manufacturable.

SUMMARY OF THE INVENTION

An amplitude independent slope detector is provided in accordance with one aspect of the invention. The detector produces a binary output signal corresponding to an information sequence carried by an applied analog signal. The analog signal has varying peak amplitudes which are bounded by first and second slopes. Some of the amplitudes may be substantially constant between respective slopes.

The detector includes a first circuit, to which the analog signal can be coupled, for detecting first and second slopes. The first circuit can be implemented with first and second RC time constant circuits. In a preferred embodiment, one of the time constants is on the order of three times the other time constant.

A second circuit is coupled to the first circuit. The second circuit is responsive only to the detected slopes.

The second circuit produces first and second binary output values, corresponding to the information sequence carried by the input analog signal. Each of the output values is initiated when a respective one of the slopes is detected and is maintained at that value in the presence of a substantially zero slope, a substantially constant amplitude, until the other slope is detected. When the other slope is detected, the other output value is initiated.

The second circuit can be implemented with an electronic comparator, such as an integrated circuit voltage comparator. A resistive feedback element can be coupled between the output of the comparator and one of the time constant circuits for improved stability.

In another aspect of the invention, the feedback resistor can be replaced with a tracking and decoupling circuit to provide symmetric hysteresis for the slope detector circuit. The tracking circuit includes an operational amplifier to track the input signal and to adjust the hysteresis symmetrically with respect to that input signal. In this configuration, neither the positive nor the negative hysteresis values will be influenced by changes in the output signal of the operational amplifier.

In yet another aspect of the invention, a circuit is provided for smoothing or minimizing noise present in peak values of an analog input signal. The apparatus includes circuitry for sensing the input analog signal.

The sensing circuitry is coupled to circuitry for clipping or substituting non-noisy peak amplitude values for the noise carrying peak amplitude values. As a result, a substantially noise-free representation of the input analog signal can be formed.

In yet another aspect of the invention, the clipping circuitry can include a peak detector circuit, which is coupled to a peak hold circuit. An output switching circuit is coupled to the peak hold circuit, as well as an amplified representation of the input analog signal. The output of the circuit is a smoothed analog output waveform from which the noise has been removed from the peak amplitudes.

In yet another aspect of the invention, a system is provided for converting an analog input signal having varying peak values and transitions to a binary output signal indicative of the transitions. The circuit includes at least one analog smoothing or clipping circuit, which processes and eliminates noise in the peak values of the applied analog input signal.

The smoothing or clipping circuit is coupled to a slope detecting circuit which detects transitions in the smoothed input signal. The slope detecting circuit then generates binary output signals in response to the detected transitions.

A second clipping circuit can be used to smooth both high or low peak values of the modulated input signal. Preferably, the slope detecting circuit will include a tracking circuit to provide a symmetrical hysteresis characteristic.

A system in accordance with the present invention can accurately convert an input analog signal to a binary signal over a wide dynamic range. The system also reliably operates in the presence of relatively long, substantially constant, peak values of the input analog signal.

Alternately, digital techniques can be used to process the modulated analog input signal. One or more digital signal processors can be used to implement this embodiment.

These and other aspects and attributes of the present invention will be discussed with reference to the following drawings and accompanying specification.

BRIEF DESCRIPTION OF THE DRAWINGS

FIG. 3 is a block diagram of a clipping circuit in accordance with the present invention;

FIG. 4 is a graph of an input and internal signals for a positive clipping circuit as illustrated in FIG. 3 as a function of time;

FIG. 5 is graph of the output of a positive clipping circuit in accordance with FIG. 3, in response to the input signal of FIG. 4 as a function of time;

DETAILED DESCRIPTION OF THE PREFERRED EMBODIMENT

Figure 1:
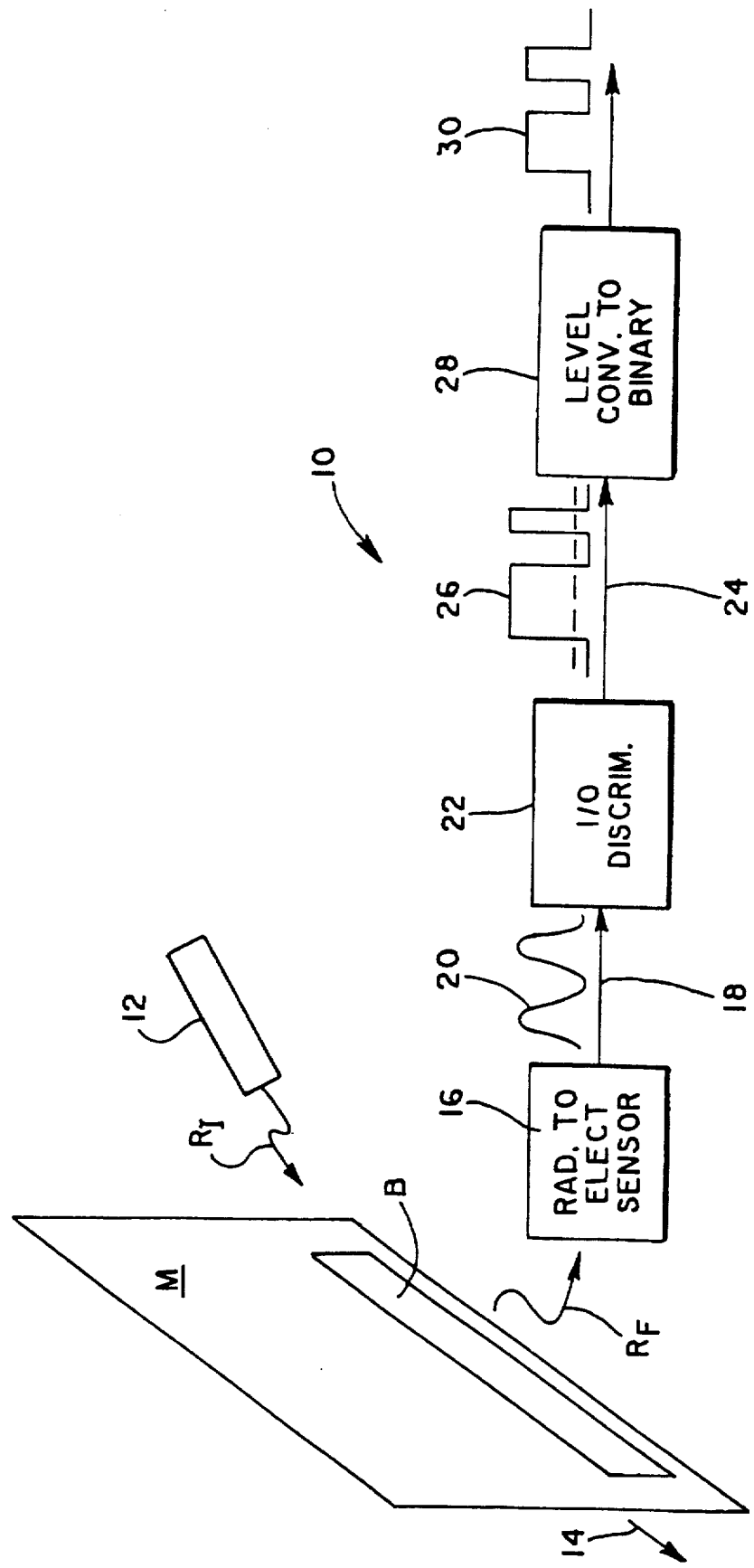
FIG. 1 is a block diagram of known bar code read circuitry.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

Figure 2:
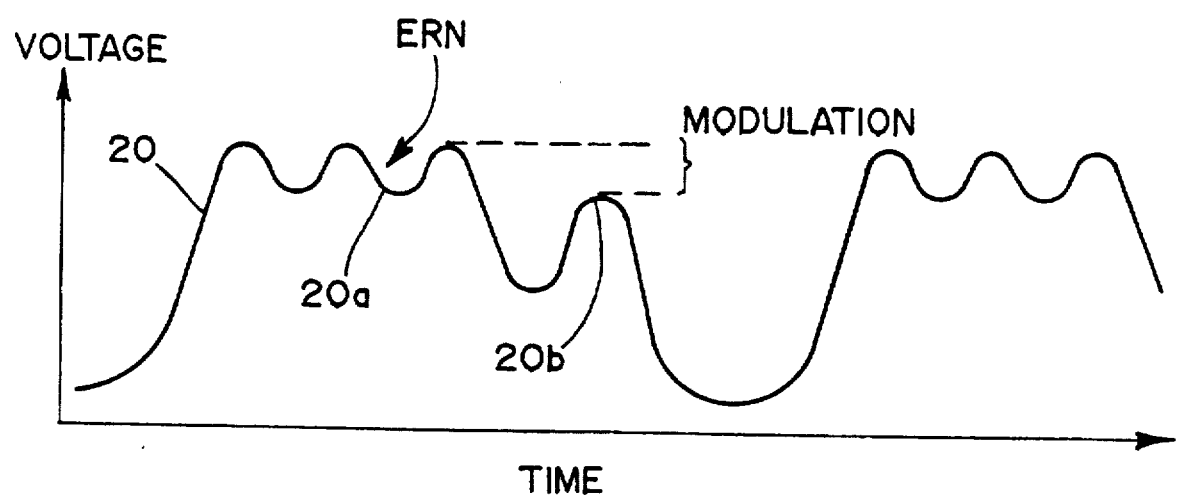
FIG. 2 is a graph of modulated analog voltage for the circuitry of FIG. 1 as a function of time.

A noise suppression or clipping circuit 40, in accordance with the present invention, is illustrated in the block diagram of FIG. 3. The circuit 40 is coupled to the sensor 16 and receives a noisy information modulated signal, corresponding to the signal 20 of FIG. 2, on the conductor or line 18.

The signal 20 is coupled to an attenuator 42 and an amplifier 44. Output from the attenuator 42 is coupled to a peak detector 46 and peak hold circuity 48.

Outputs 44a, 48a from the amplifier 44 and the peak hold circuit 48 are coupled via conductors or lines 44b, 48b to a voltage limiter circuit 50. The output 50a from the limiter circuit 50, on a line 50b, is a non-noisy analog signal, representative of the noisy input signal 20.

The peak hold circuitry 48 includes an RC time constant to sense and hold the maximum positive excursion of the input signal 20. In addition, the input signal 20 is amplified by the amplifier 44, an amount that causes all of the ERN negative going excursions to be at a higher voltage than the voltage at the output of the peak hold circuit 48.

Only the lower voltage signal of the peak hold circuit 48, on the line 48b, or the output 44a of the amplifier 44, on the line 44b, is output from the limiter 50, on the line 50b.

Hence, the ERN noise can be eliminated from the output signal 50a.

Thus, when a wide, large amplitude element with ERN noise is being detected, the peak detector 46 and peak hold circuit 48 produces the output. When the bar code sensor senses lower amplitude elements without the ERN noise, the amplified signal from the amplifier 44 becomes the output.

ERN noise can be eliminated for positive or negative peak values, such as 20a, using the circuit 40. The attenuator 42 may not be needed for a negative peak clipping or smoothing circuit.

FIG. 4 is a graph illustrating various signals for the circuit of FIG. 3 configured to smooth positive peak input values for the signal 20. FIG. 5 illustrates the smoothed output 51p from the circuit 40 when so configured.

Figure 6:
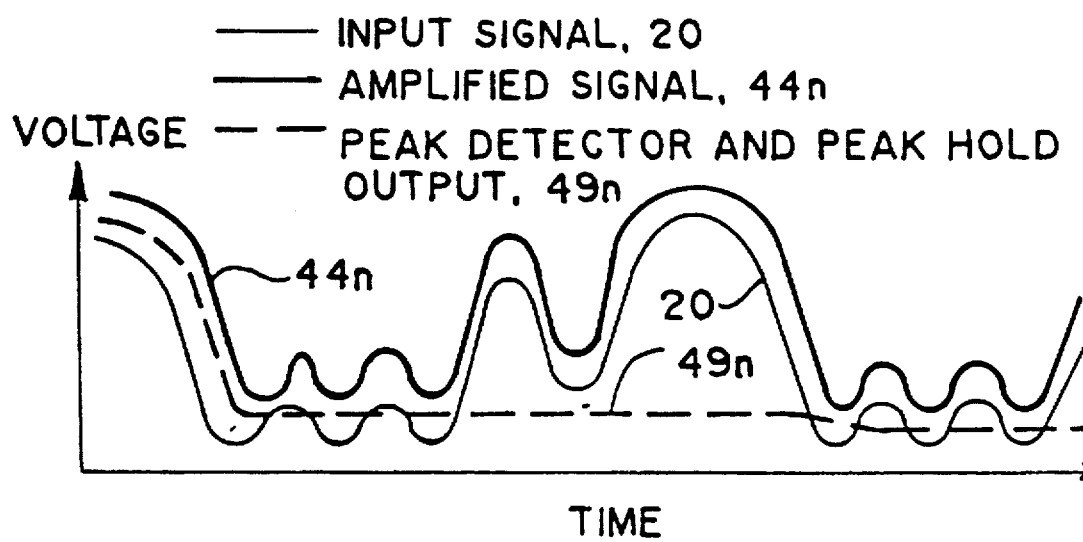
FIG. 6 is a graph of an input and internal signals for a negative clipping circuit as in FIG. 3 as a function of time.
Figure 7:
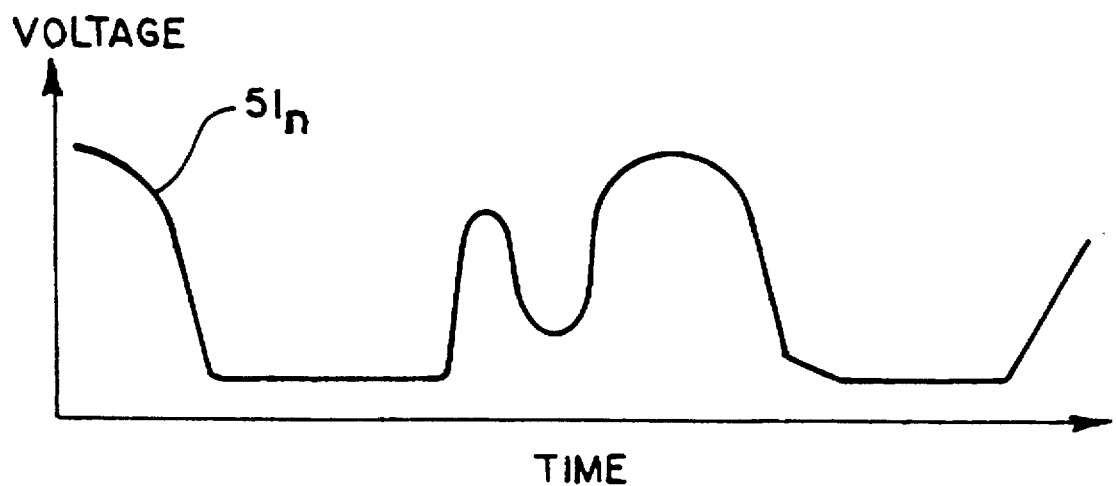
FIG. 7 is a graph of the output of a negative clipping circuit in accordance with FIG. 3, in response to the input signal of FIG. 6 as a function of time.

FIGS. 6 and 7 illustrate waveforms associated with the smoothing circuit 40 when configured to clip and smooth negative peak values of the modulated analog signal 20. The output signal 51n of FIG. 7 has smoothed negative peak values.

For voltage signals from the sensor 16 which are positive, the attenuator circuit 42 and amplifier 44 have opposite effects. The attenuator 42 reduces the waveform amplitude and the amplifier 44 increases the amplitude.

For signals from the sensor 16 which are negative, the attenuator circuit 42 and amplifier circuit 44 act in the same direction, moving the waveform towards a negative voltage reference. In this case, it may be necessary to attenuate the signal more than the amplification of the negative voltage.

For either positive or negative peak signals, the proper combination of attenuation and amplification is one where the lowest expected ERN voltage amplitude in the amplified signal is greater than the largest voltage amplitude in the attenuated signals for a bar code element. When the output of the positive peak detector and hold circuits 46 and 48 and the output of the amplifier 44 are connected to the voltage limiter circuit 50, the output on the line 50b is the lower voltage amplitude of the two inputs.

Figure 8:
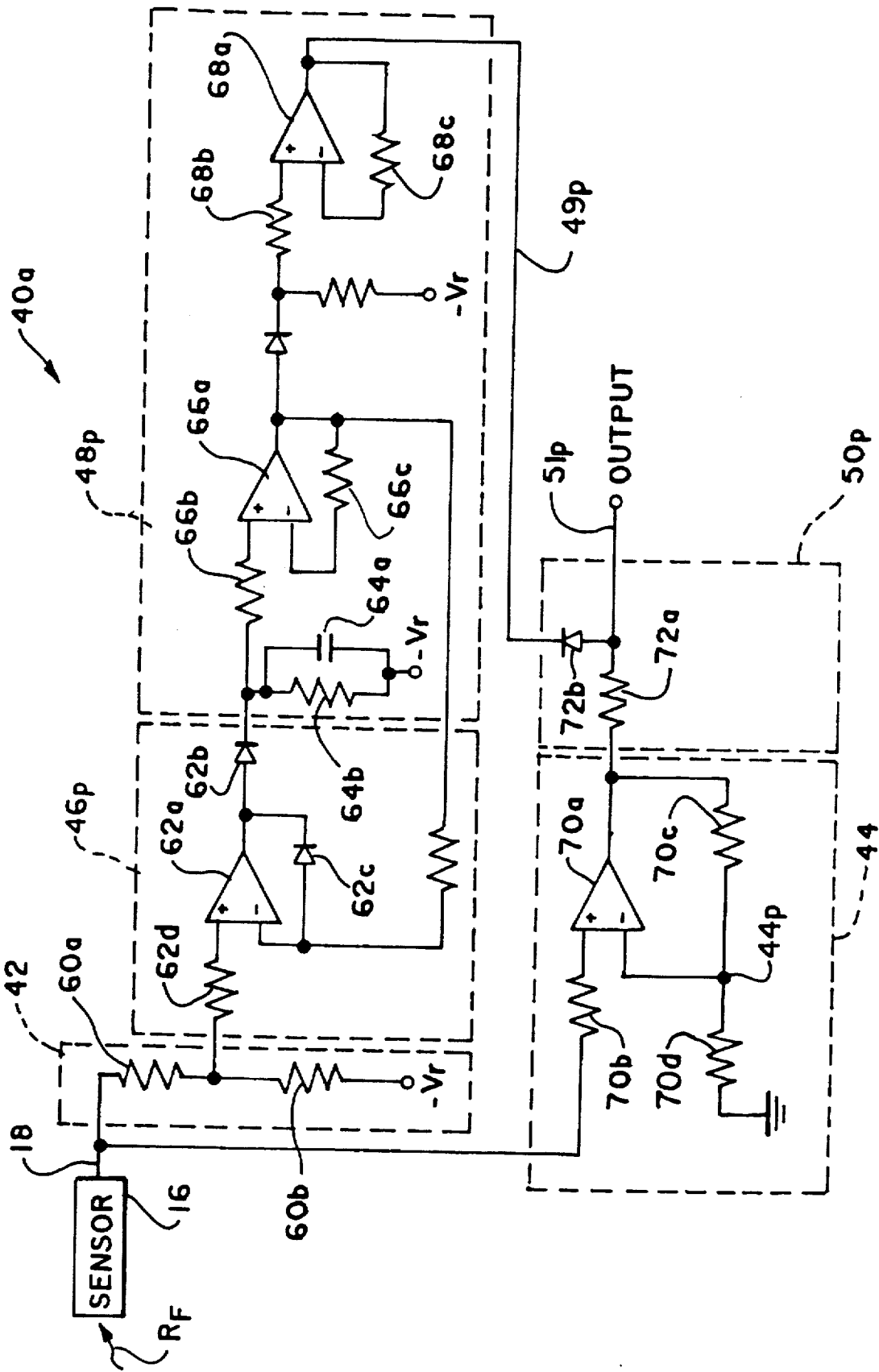
FIG. 8 is a schematic of the circuit of FIG. 3 configured to clip and smooth positive peak values of an input signal.

FIG. 8 illustrates positive peak clipping circuitry 40a by which the unwanted ERN or positive peak values of the incoming signal 20 is eliminated. The signal from an optical sensor 16 is input to the attenuator 42, formed of resistors 60a, and 60b. The amplitude of the signal 20 is reduced by the ratio of resistor 60a to the sum of resistors 60a and 60b.

If the sensor voltage waveform is positive, the negative voltage reference $-V_r$ is set to ground potential. If the sensor waveform is negative, the voltage reference $-V_r$ is a fixed negative voltage of lower potential than the sensor waveform.

The attenuated signal enters the peak detector circuit 46p. The positive peak detector 46p includes an operational amplifier 62a, diodes 62b, 62c, and an input resistor 62d.

Diode 62b limits the output of amplifier 62a to voltages higher than that stored at the input of the peak hold circuit 48. The diode 62c limits the output of the amplifier 62a to a maximum of one diode forward voltage drop from the stored voltage on the input to the peak hold circuit 48.

The positive peak hold circuit 48p contains a storage capacitor 64a and a resistor 64b referenced to $-V_r$. A time constant formed by the capacitor 64a and resistor 64b allows a slow decay in voltage towards $-V_r$ relative to the rate at which bar and space elements are sensed.

Thus, if the overall signal level changes as a bar code is scanned due to reflectance or other optical variations, the peak hold circuitry 48 can reestablish the relative peak voltage based on recent signal levels. Otherwise, the peak hold circuit 48 is fixed at the highest Voltage sensed by the peak detector circuit 46. Any ERN voltage in the incoming waveform 20 does not change the output of the peak hold circuit 48.

Amplifiers 66a and 68a, along with resistors 66b and 66c, and 68b and 68c, respectively, buffer the signal from loading by other circuit elements.

The output of the peak detector and hold circuits 46p, 48p is the maximum voltage of the attenuated output signal, slowly decaying in amplitude based on the RC time constant formed of resistor 64b and capacitor 64a. As soon as the attenuated input signal amplitude rises above the voltage on the capacitor 64a, the output of amplifier 62a quickly increases the voltage on that capacitor to be equal to the amplifier input. The output of the peak detector and peak hold circuits on a line 49p thus rises quickly and falls slowly.

The sensor waveform on the line 18 is also input to amplifier circuit 44. The amplifier circuit 44 includes an operational amplifier 70a, input resistor 70b, and feedback resistors 70c, 70d. It is the proper selection of attenuation in the circuit 42 and amplification in the circuit 44 which suppresses the unwanted ERN voltage. The gain of this circuit is equal to one plus the ratio of the resistor 70c to the resistor 70d.

With the undesirable ERN eliminated, a differentiator or other circuitry can be employed to determine bar and space edges. This edge determination process can convert the waveform into digital levels as a function of time for subsequent decoding.

Figure 9:
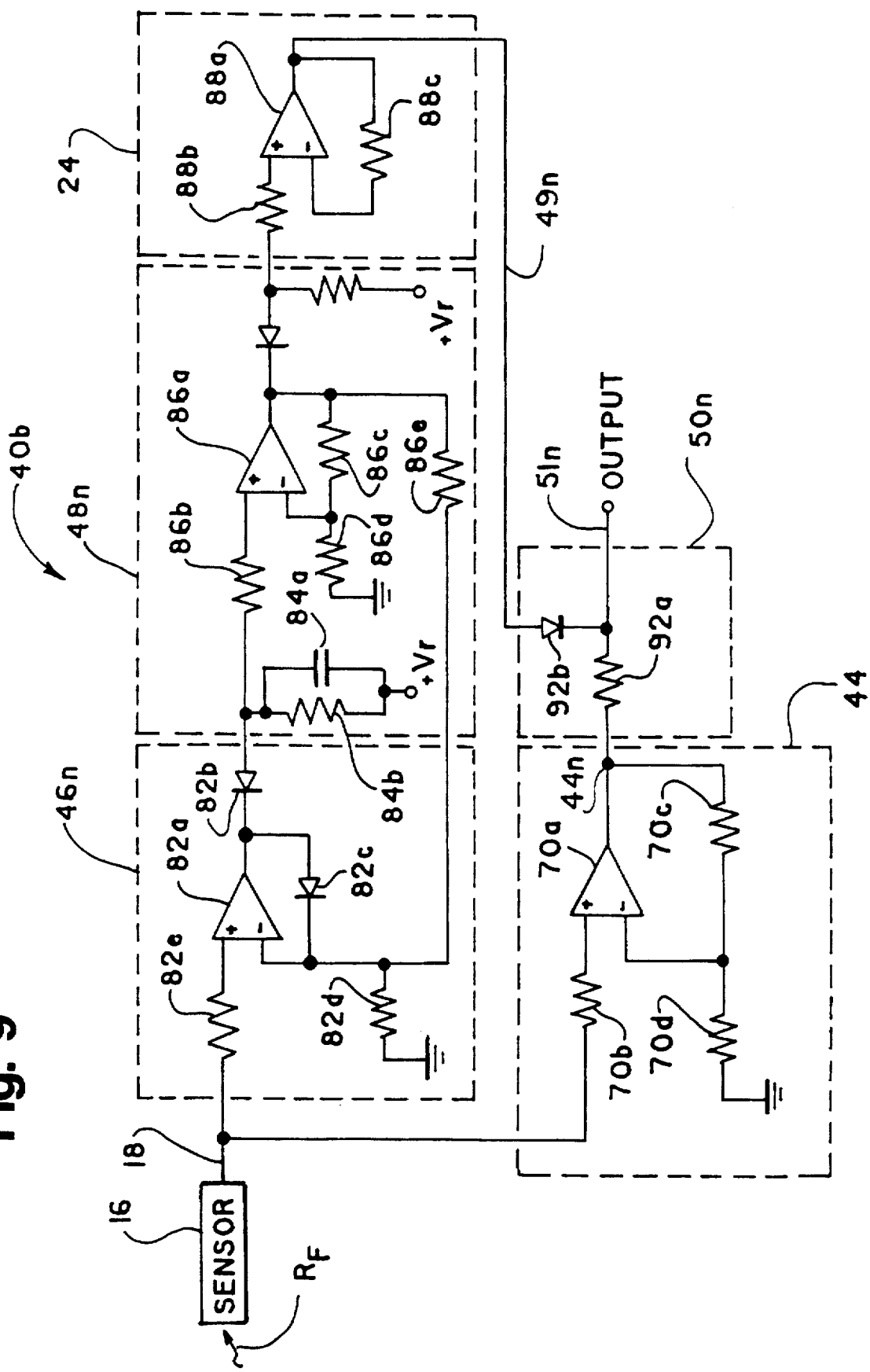
FIG. 9 is a schematic diagram of the circuit of FIG. 3 configured to clip and smooth negative peak values of an input signal.

FIG. 9 is a schematic of a negative peak clipping and smoothing circuit 40b by which the unwanted ERN on negative peak values of the incoming signal can be eliminated. Because of changes in the connectivity of the negative peak detector 46n and negative peak hold circuit 48n, the attenuator 42 can be eliminated from the negative peak smoothing circuit 40b.

The signal from an optical sensor 16 is input to the negative peak detector circuit 46n. That circuit includes an amplifier 82a, an output diode 82b, feedback diode and resistor 82c, 82d, and an input resistor 82e.

The diode 82b restricts the amplifier 82a to outputting only voltages lower than that on the input of the peak hold circuit 48n. Diode 82c maintains the output of amplifier 82a a maximum of one diode forward voltage drop from the voltage on the input to the negative peak hold circuit 48n.

The negative peak hold circuit 48n includes an input RC time constant circuit, with capacitor 84a, and resistor 84b, coupled to an operational amplifier 86a through an input resistor 86b. The resistor 86c provides a feedback path and the resistor 86d provides a negative input for the operational amplifier 86a.

Output from the amplifier 86a is coupled to a buffer output amplifier 88a via an input resistor 88b. A feedback resistor 88c is coupled between the output 48n and the inverted input of the amplifier 88a. The capacitor 84a and resistor 84b are coupled to a positive voltage $+V_r$.

If the incoming waveform is negative $+V_r$ is set to ground potential. For positive voltage waveforms, $+V_r$ is set to a level which is higher than the highest expected voltage of any negative excursion of the incoming signal plus the ERN.

The time constant formed by the capacitor 84a and resistor 84b allows a slow decay in voltage towards the $+V_r$ relative to the rate at which bar and space elements are sensed. Thus, if the overall input signal level changes as a bar code is scanned due to reflectance or other optical variations, the peak hold circuity 48n can reestablish the relative peak voltage based on recent signal levels. Otherwise, the peak hold circuit is fixed at the lowest voltage sensed by the negative peak detector circuit 46n. Any ERN voltage in the incoming waveform does not change the output of the peak hold circuit 48n.

The peak detector circuit 46n and the peak hold circuit 48n together provide an overall gain factor for the input signal. When the circuits are configured such that if the ratio of resistor 82e to resistor 82d is equal to the ratio of resistor 86c to resistor 86d, the gain of the two circuits is equal to:

$$\text{Gain} = 1 + \frac{R86e}{R82d}$$

The voltage follower, amplifier 88a, and resistors 88b and 88c, respectively, buffer the stored peak signal from loading by other circuit elements.

The output of the negative peak hold circuit 48n is the value of the minimum voltage of the input signal times the gain. This value slowly rises in amplitude towards $+V_r$ based on the time constant of capacitor 84a and resistor 84b.

As soon as the input signal amplitude drops below the stored voltage on the capacitor 84a, the output of amplifier 82a quickly restores the voltage on the capacitor 84a to be equal to the amplified input. As a result, the output of the negative peak hold circuit 48n falls quickly and rises slowly.

In addition to the negative peak detector and hold circuits 46n, 48n, the sensor waveform is input to the amplifier circuit 44. The proper selection of amplification in circuit 44 relative to the amplification formed by circuits 46n and 48n, suppresses the unwanted ERN voltage. The gain of the circuit is equal to one plus the ratio of the resistor 70c to the resistor 70d.

For either positive or negative signals, the proper amplification levels are where the highest expect ERN voltage in the amplified signal from circuit 44 is lower than the lowest voltage produced by circuits 46n and 48n.

The output of the negative peak detector 46n and hold circuits 48n, and the output of the amplifier 44 are connected to the voltage limiter circuit 50n. The voltage limiter circuit 50n includes a resistor 92a and a diode 92b. The output of the limiter 50n on the line 51n is the higher voltage of the two input lines 44n and 49n.

FIG. 6 illustrates the output on the line 49n of the negative peak detector and hold circuitry 46n, 48n, and the output on the line 44n of the amplifier 44 in relation to the sensor input waveform. FIG. 7 illustrates how the voltage limiter circuit 50n alternately chooses which of the two inputs drives the output signal on the line 51n, depending upon the relative magnitudes.

Figure 10:
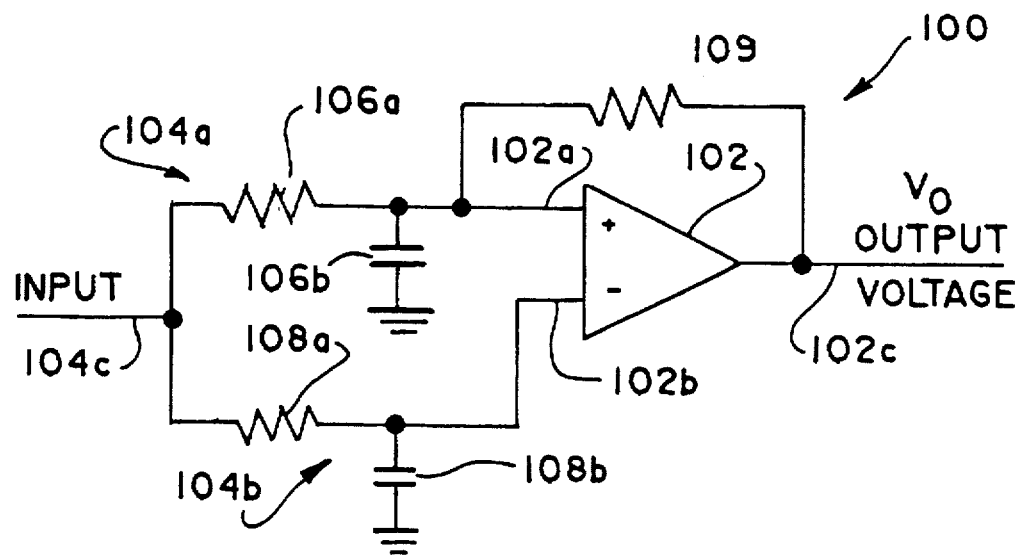
FIG. 10 is a schematic diagram of a slope detector in accordance with the present invention.

Subsequent to removing, ERN noise using the smoothing circuits of FIGS. 8 and 9, a determination must be made as to which portions of the smoothed signal should be represented as binary "one" or binary "zero" value. This determination preferably will be made using an edge detector 100, in accordance with the present invention, as illustrated in FIG. 10.

The detector 100 can be used to detect bar code elements moving over a wide range of velocities and is insensitive to modulation and small amplitude, high frequency noise. A comparator 102 and first and second RC circuits 104a, 104b are configured such that the output of the detector 100 is determined by the sign of the difference of the first derivative of the voltage signals at inputs 102a, 102b to the comparator 102.

This arrangement incorporates the advantage of absolute amplitude insensitivity without the excessive noise sensitivity of a differentiator circuit. The output of the detector 100 on a line 102c is one of two discrete voltage values which, if not already digital 5 volts and 0 volts, can easily be converted into such.

The detector 100 has an input line 104c coupled to the circuits 104a, 104b. The circuit 104a includes a resistor 106a and a capacitor 106b. The circuit 104b includes a resistor 108a and a capacitor 108b.

The output voltage 1/0 on the line 102c is given by:

$$V_0 = A \, sgn(V+ - V-) \quad (1)$$

Where:

A=The amplitude of the output signal

V+=The voltage at the positive input 102a of the comparator 102

V-=The voltage at the negative input 102b of the comparator 102 sgn(x)=sign function of x,
  sgn(x)=1, $x \geq 0$
  sgn(x)=-1, $x < 0$

Then:

$$V_0 = A \, sgn[\tau 104b^* (V-)' - \tau 104a^* (V+)'] \quad (2)$$

Where:

(V+)'=The first derivative with respect to time of the input voltage signal V+

(V-)'=The first derivative with respect to time of the input voltage signal V-

$\tau 104a = R106a * C106b$ $\tau 104b = R108a * C108b$

A feedback resistor 109 is used to create a small amount of hysteresis in the detector 100. This feedback increases circuit stability in the presence of electrical noise. Consequently, the resistance value R109 of the resistor 109 is generally much greater than the resistance value R106a of the input resistor 106a (2 or 3 orders of magnitude, for example).

Proper bar code element detection is achieved by the detector 100 when the RC time constant $\tau 104a$ formed by the resistor 106a and capacitor 106b, is smaller than the RC time constant $\tau 104b$ formed by the resistor 108a and the capacitor 108b. With this arrangement, the voltage signal on the capacitor 106b will phase lead the signal on the capacitor 108b.

When the sensor 16 scans an element (bar or space), the voltage signal input on the line 104c will peak high or low. The input signal then move from that peak value towards an opposite peak.

As the signal peaks, (V+)' at the input 102a will change sign before (V-)' at the input 102b. Since the time constant $\tau 104a$ is less than the time constant $\tau 104b$, the output $V_0$ on the line 102c will not change sign, which determines the element edge, until (V-)' is reduced in amplitude such that:

$$(V-)' < \left[ \frac{R106a * C106b}{R108a * C108b} \right] * (V+)'$$

For example, if $\tau 104b = 3 * \tau 104a$, then the output $V_0$ of the comparator 102 will not change its output until $(V+)' > 3 * (V-)'$.

The selection of the ratio between $\tau 104a$ and $\tau 104b$ is a trade-off between increased sensitivity to bar and space peaks, and immunity from unwanted transitions caused by noise. As the ratio increases, (V+)' must be larger and larger than (V-)' in order to change the comparator output. In this manner, the excess sensitivity to high frequency noise, characteristic of differentiator circuits, is avoided.

Because equation 2 does not contain any terms relative to the signal amplitude, the detector 100 is insensitive to the effects of modulation. Only the derivative input signals (V+)' and (V-)' determine the output $V_0$.

The positive feedback formed by the inclusion of resistor 109 acts to suppress unwanted output changes caused by noise, or oscillation of the comparator. The amount of hysteresis is determined by resistors 106a and 109. The hysteresis voltage is given by:

$$\text{Hysteresis Voltage} = |R106a/(R106a+R109)| * V_0$$

The hysteresis voltage serves to assure that when $\tau 104a^* (V+)'$ approaches $\tau 104b^*(V-)'$ only one transition of $V_0$ (as opposed to several, which can be caused by the influence of noise) occurs.

Figure 11:
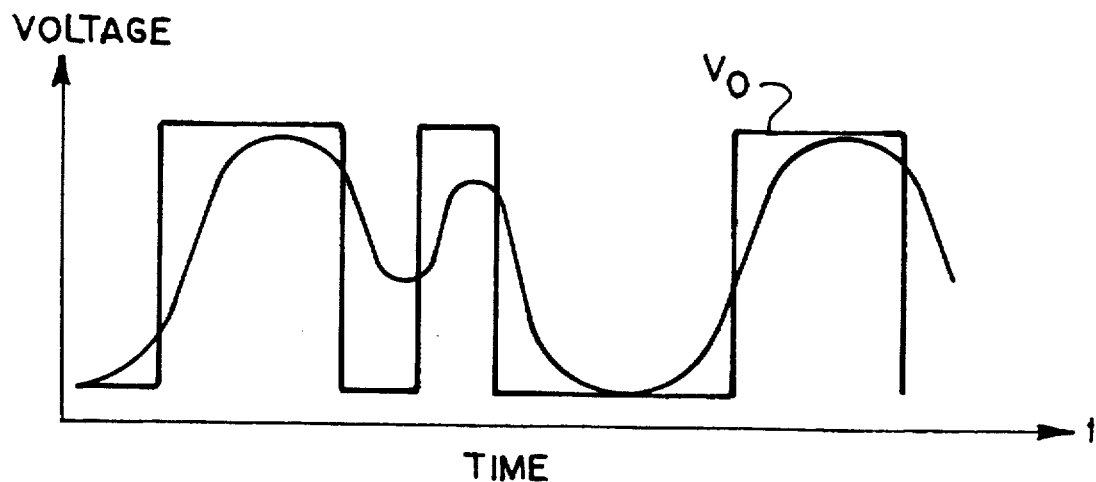
FIG. 11 is a graph of input and output waveforms of the detector of FIG. 10 as a function of time.

If the signal 20, illustrated in FIG. 1, is input into the slope detector 100, the comparator 102 will switch state each time the sign function in equation 2 changes from +1 to -1, or vice versa. FIG. 11 illustrates this process as a function of time for a non-noisy input signal.

As noted previously in FIG. 10, hysteresis is provided in the detector 100 by connecting resistor 109 between the output 102c comparator 102 and the positive input 102a. However, this arrangement may result in a non-symmetrical hysteresis condition.

If the amplitude of the positive output voltage of the comparator 102 is not equal to the amplitude of the negative output voltage, the hysteresis will not be symmetric with respect to the signal level $V_0$. A greater positive feedback voltage must be overcome in order to change the output in one direction than is required to change in the other direction.

The asymmetric hysteresis condition mentioned above may limit the operation of the slope detector circuit 100. For example, if the smaller of the two hysteresis voltages is scaled for the expected input waveform, some small bar or space features may not generate a (V+)' or (V-)' large enough to cause a state change in the comparator 102.

If the larger of the hysteresis voltages is chosen for scaling, the reduced noise immunity of the smaller hysteresis may result in unwanted output changes and bar code misreads. In either case, the reduced sensitivity or lower noise immunity can result in lower performance of the detector 100.

Another limitation to the operation of the slope detector 100 is that most comparators have open-collector outputs. A resistor, connected between the comparator output and a positive voltage source, pulls the signal to its "high" level. If there are amplitude changes in the positive voltage source due to current loading by another device sharing the source, noise generated by or conducted into the voltage source (or other phenomena), $V_0$ variation results in changes in hysteresis voltage.

As a result, it may be necessary to increase the hysteresis amplitude by an amount which anticipates these events. Once again, this may result in larger than necessary positive feedback for the detector.

Therefore, the asymmetrical voltages and they $V_0$ amplitude sensitivity serve to limit the performance of the slope detector 100 in some circumstances. To improve circuit performance, a tracking hysteresis circuit can be used instead of the resistor 108.

Figure 12:
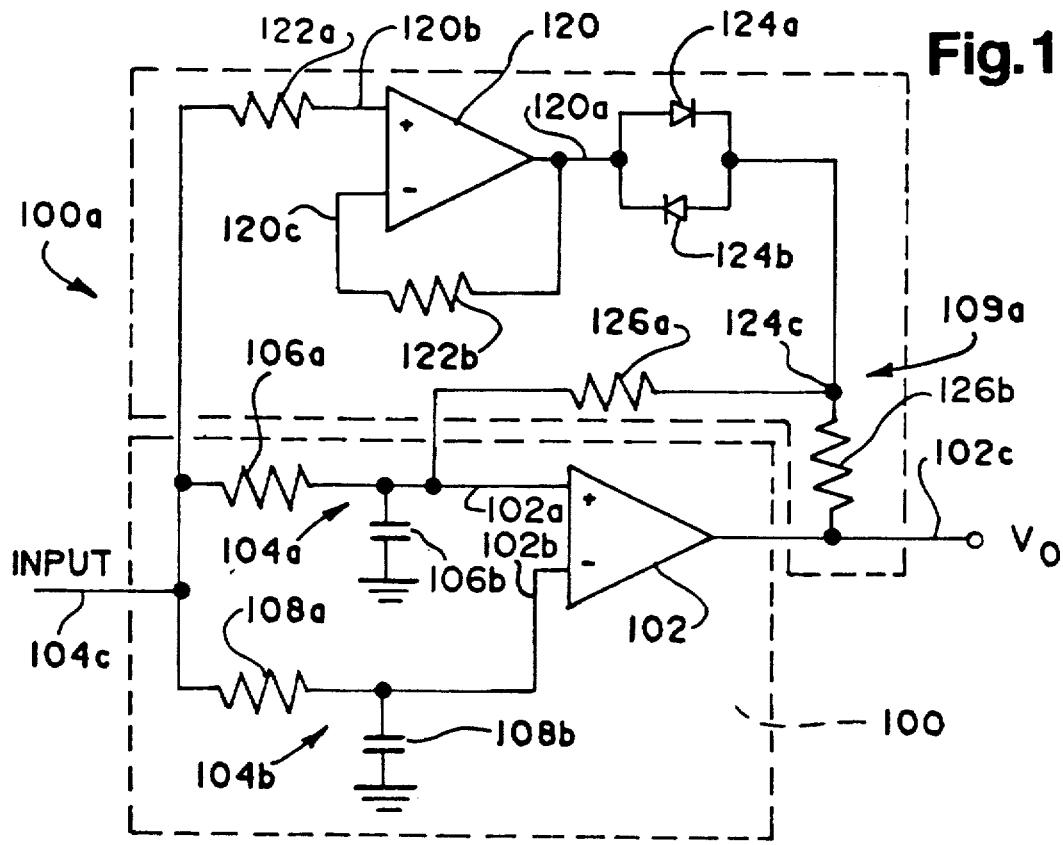
FIG. 12 is a schematic of an improved slope detector in accordance with the present invention.

FIG. 12 illustrates another circuit 100a with a feedback circuit 109a, which provides a symmetric hysteresis characteristic and is sensitive to comparator output amplitudes. The detector 100 as described above is incorporated into the circuit 100a of FIG. 12. The feedback amplifier circuit 109a tracks the input signal on the line 104e and to regulate the hysteresis symmetrically with respect thereto. In this manner, the positive and negative hysteresis values will be equal, and will not be influenced by changes in $V_O$.

The circuit 109a includes an operational amplifier 120, resistors 122a and 122b, diodes 124a and 124b, and resistors 126a and 126b. The operational amplifier 120 has been configured as a buffer, with the output of the device on a line 120a equal to the voltage at its positive input terminal 120b. The input 120b is connected to the input signal on the line 104c through the input resistor 122a. The diodes 124a and 124b clamp the voltage at node 124c to a value equal to the input signal ± one diode forward voltage drop (i.e., about 0.7 volts).

The comparator 102 is configured such that its output voltage $V_O$ on the line 102c is higher than the input signal on the line 104c for $V_O$ "high" and lower than the input signal for $V_O$="low". If the output $V_O$ on the line 102c is at a high voltage, current will flow from the comparator 102 through resistor 126b and diode 124b into the input 120c of the amplifier 120. Since the amplifier output on the line 120a is set at the input signal level, the voltage at the node 124c will be set to the voltage at the input on the line 104c plus the forward voltage drop of the diode 124b.

If the comparator output on the line 102c is at a low voltage, current flows from amplifier 120 through diode 124a and resistor 126b into the comparator 102. This arrangement sets the voltage at the node 124c to a value equal to the input signal level minus the forward voltage drop of the diode 124a.

As in the original slope detector 100, the output of the comparator of the detector 100a is given by equation 1. If the current flow into the inputs of the comparator 102 is negligible, and the output voltage $V_O$ for the detector 100a can be expressed as:

$$V_o = A \operatorname{sgn}\left[\left(\tau 104b(V-)' - |\tau 104a)/\left(1 + \frac{R106a}{R126a}\right)\right](V+)' \pm V_D \frac{(R106a)}{(R126a)}\right]$$

The hysteresis voltage $$\pm V_D * \frac{(R106a)}{(R126a)}$$

is no longer a function of $V_O$. It is determined by the ratio of resistors R106a and R126a, and the forward voltage drop $V_D$ of the respective diode 124a or 124b. The hysteresis voltage amplitude is thus independent of whether the output $V_O$ is "high" or "low".

This symmetric hysteresis characteristic permits a choice of the ratio of resistors which, when multiplied by the diode forward voltage drop $V_D$, is large enough to suppress unwanted transitions. This value is still small enough to allow small but valid changes in (V+)' and (V−)' to be sensed as bar and space elements, thereby increasing the performance range of the detector a over that of the detector 100.

Like the slope detector 100 described above, the output $V_O$ of the detector 100a is not a function of the input signal level, but of the first derivative of the voltages on the inputs 102a, 102b of the comparator 102. Thus, the advantages of the insensitivity to modulation or amplitude variation are preserved in the detector 100a.

The previously discussed modules can be combined to form an improved bar code digitizing system 140, in accordance with the present invention. The system 140, as described subsequently, can detect and properly digitize high and low speed bar coded signals that have been converted to a modulated analog voltage, such as the voltage 20 of FIG. 2.

Figure 13:
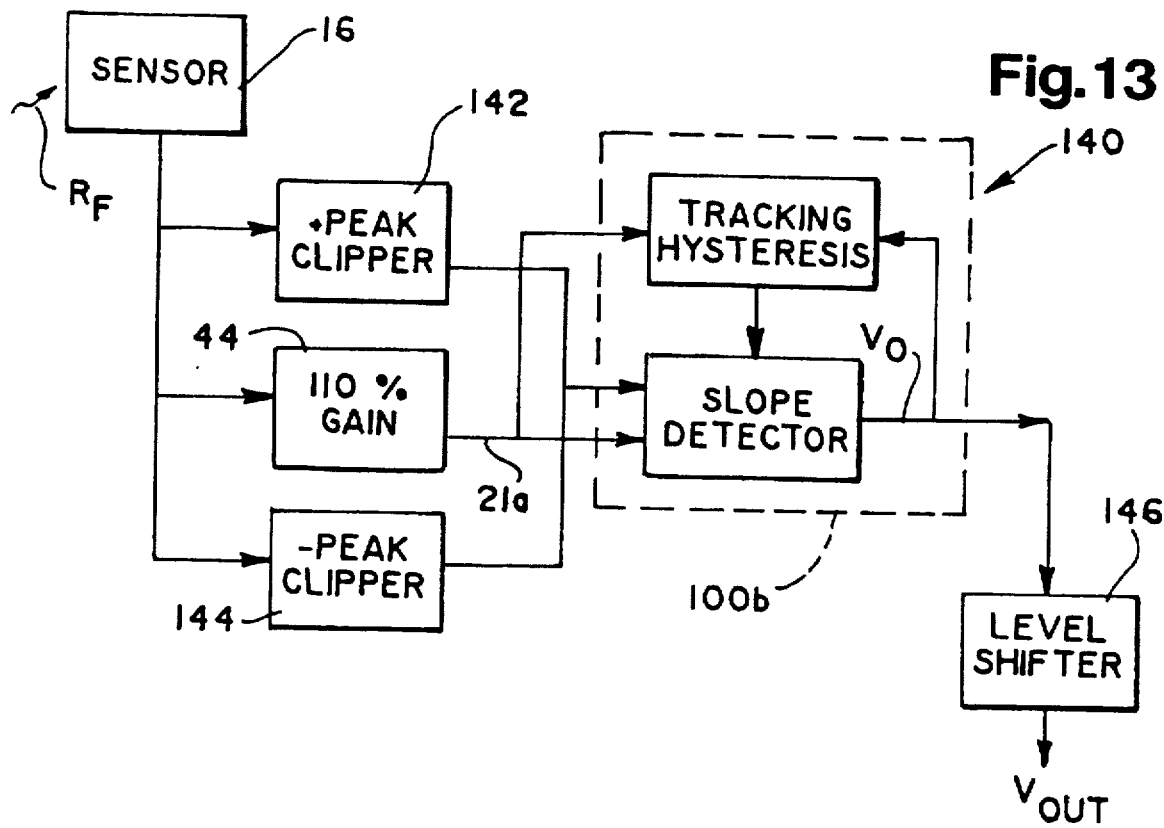
FIG. 13 is a block diagram of a bar code digitizing system in accordance with the present invention.

The circuit 140, with reference to FIG. 13, includes positive and negative peak clipping circuits 142, 144, which are similar structurally and functionally to the positive and negative peak smoothing circuits 40a and 40b of FIGS. 8 and 9. In the system 140, the clippers 142, 144 share a common gain stage 44. As described previously, the clipper circuits 142, 144, in combination with the gain stage 44, flatten the ERN voltage, such as the ERN voltage 20a of FIG. 2, thereby forming a composite, processed representation 21 of the input modulated analog signal 20.

Figure 15:
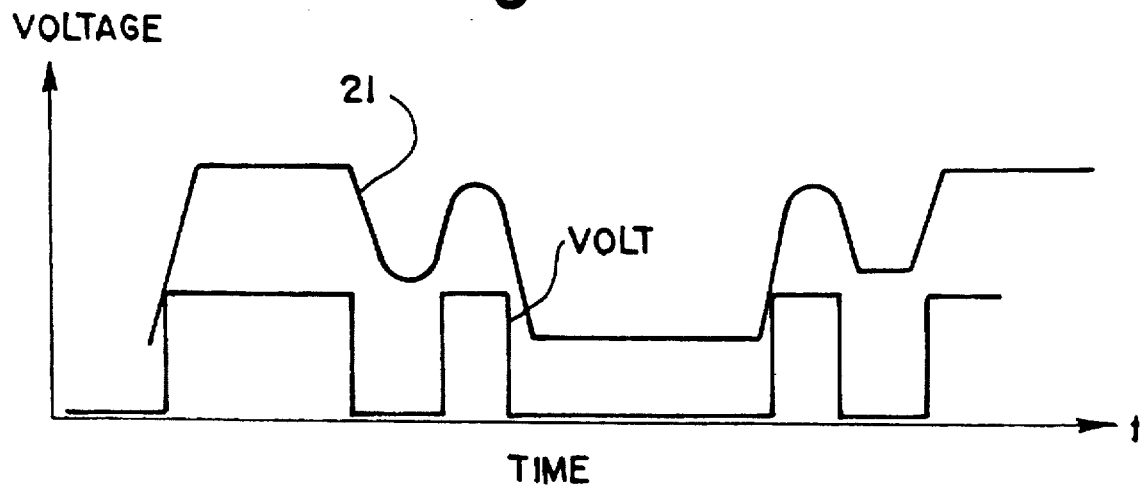
FIG. 15 is a graph of various signals of the circuit of FIG. 14 as a function of time.

The processed analog signal 21, illustrated in FIG. 15, on a line 21a, is then input to a slope detector circuit 100b, similar to the detector 100a. The output signal $V_O$ from the detector 100b can then be translated, if needed, to logic levels in a translator or shifter circuit 146 to produce a binary output signal $V_{out}$.

Figure 14:
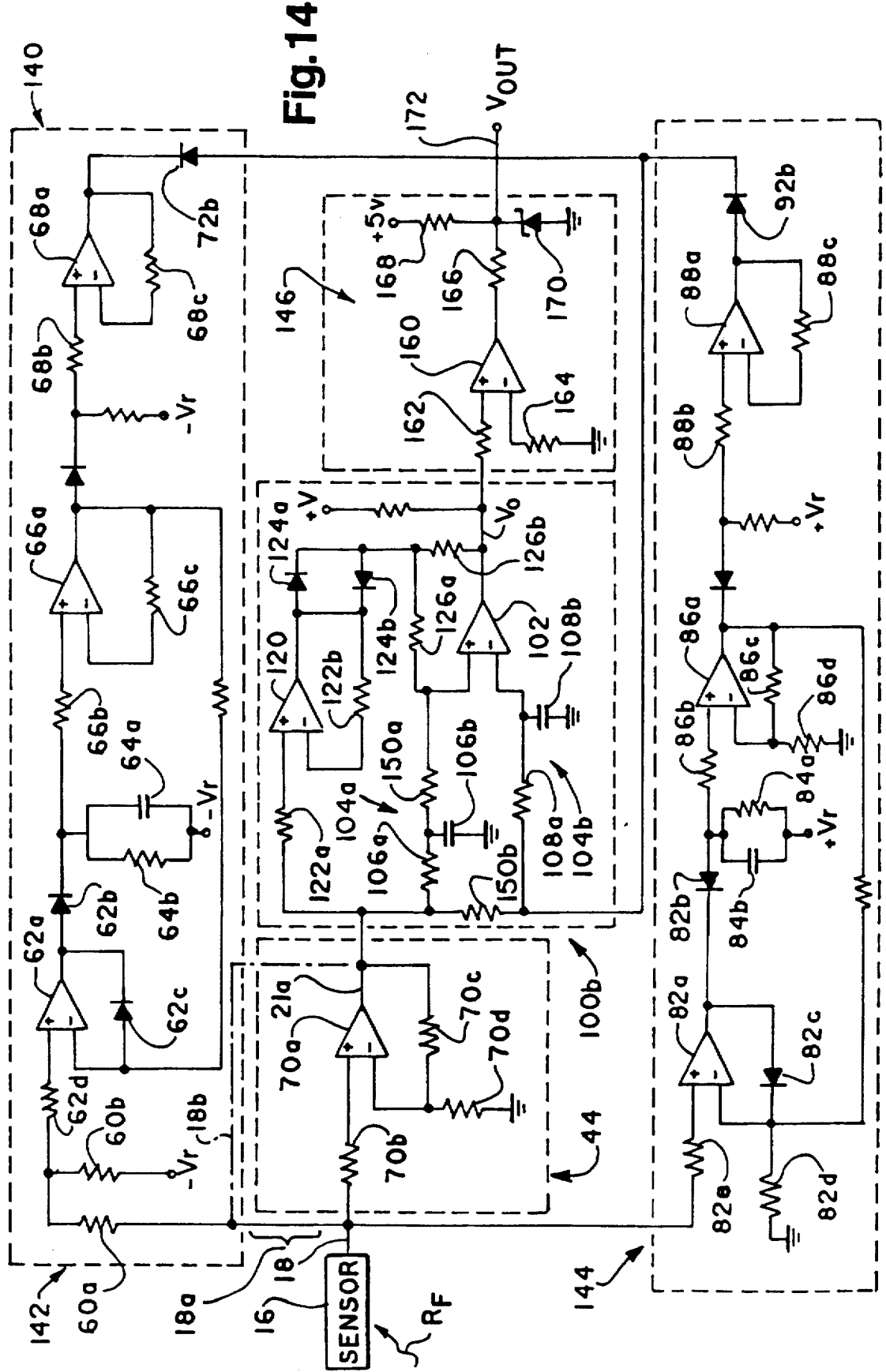
FIG. 14 is a schematic diagram of the digitizing system of FIG. 13.

FIG. 14 is a schematic of the system 140. In FIG. 14, elements which were previously described in connection with FIGS. 8, 9, and 12 have been given the same identification numerals, and need not be discussed further.

With respect to FIG. 14, the input signal 20 from the bar code sensor 16 is input into the three subcircuits, the positive peak clipper 142, the negative peak clipper 144, and the gain amplifier 44. As previously described with respect to FIGS. 8 and 9, the positive peak clipper attenuator, formed by resistors 60a and 60b, and the gain of the negative peak clipper 144, are matched to the gain in circuit 44 such that all the ERN on the highest and lowest amplitude elements, such as 20a, is higher or lower than the respective peak levels of the input signal 20.

The peak clipping circuits 142, 144, as previously discussed, do not affect modulation per se, but smooth or flatten the tops and bottoms of the highest and lowest amplitude elements. FIG. 15 illustrates the effects of conditioning the input signal 20 of FIG. 1 with the positive and negative peak clipping circuits 142, 144, thereby producing a processed noise-free representation 21 thereof.

It is signals such as 21, shown in FIG. 15, which are input into the slope detector circuit 100b. A modification to the circuit 100a, described in FIG. 12, has been made in order to extend the performance of the system.

Resistors 150a and 150b have been added to the slope detecting circuit 100b of FIG. 14. The output of the detector 100b is given by equation 1.

For proper operation, the value of resistor 126a must be greater than the value of resistor 150a, such that:

$$R126a + R150a \approx R126a$$
AND
$$\frac{1}{R126a} \approx 0$$

There are two cases to consider. When the output of the gain stage 44 is higher than the positive peak clipper voltage output, or lower than the negative peak clipper output, the active peak clipper voltage establishes the input at resistor 108a. When the gain circuit 44 voltage is between the two peak levels, the gain output sets the voltage for the negative input to the slope detector 100b. Case A will refer to the circumstance where circuit 44 sets the voltage; and Case B will refer to the case where a peak clipper circuit output sets the slope detector input level.

The output of the slope detector 100b is:

$$V_o = A\text{sgn}\left[(R108a + R150b)(C108b)(V-)' - (R106a * C106b)(v+)' + (V_{pc} - V_g) \pm V_d * \frac{R106a}{R126a}\right] \text{Case A}$$

$$V_o = \left[(R108a * C108b)(V-)' - (R106a * C106b) * (V+)' \pm V_d * \frac{R106a}{R126a}\right] \text{Case B}$$

Cases A and B represent the expected behavior for the circuit 140. The term $$\pm V_d * \frac{R106a}{R126a}$$

is small, but has been retained since it represents the hysteresis voltage on the slope detector. $V_{PC}$ is the voltage level of the active peak clipper circuit and $V_g$ is the voltage output from the gain circuit 44. The system accurately decodes a high or low speed, distorted signal as is described below.

With the use of slope detection to discriminate bars and spaces, the circuit is insensitive to the absolute signal amplitude, or changes in the amplitude across the bar code. Modulation of the signal or overall amplitude changes across the code occur in the waveform where the Case B equation applies. Case B has no terms which are dependent upon the input signal amplitude. Only first derivative (slope) terms determine the sign of the output $V_0$.

The positive feedback term of ($\pm V_d$R106a/R126a) is small in magnitude so that low amplitude bar and space edges can generate a (V+)' and (V−)' large enough to change the sign of $V_0$. The small amount of hysteresis is sufficient to keep the comparator 102 from oscillating at those points in a time when (V+)' and (V−)' are very close in magnitude.

There is a circumstance where (V+)' and (V−)' become very close to zero. That is when a wide element is being scanned such that the constant voltage of a clipped bar or space element drives (V+)' and (V−)' down in magnitude. This is Case A, defined earlier.

If Case A is examined, there is an extra voltage term which acts as additional hysteresis to the small positive feedback. The term ($V_{pc}-V_g$) serves to increase the potential difference between the positive and negative inputs to the comparator 102 at the same time that (V+)' and (V−)' become very small. This difference adds to the positive feedback to protect the system from small voltage variations such as input offset voltage, electronic noise, vibration induced signal transients, or other phenomena which may be present.

During the scan of a bar code element where one of the peak clippers flattens the signal, the ($V_{pc}-V_g$) term increases the effective noise suppression. When the input signal falls below the peak value, this extra term disappears, allowing small amplitude elements to be detectable.

Thus, the slope detector 100b can detect high speed, highly modulated bar code elements. It can also properly decode very slow, very flat waveform elements.

The tracking hysteresis circuit 109a requires that the output levels of the slope detector 100b be higher than the highest input voltage from the sensor and lower than the lowest input voltage therefrom. That often means that the slope detector output levels are not digital commonly used +5 volt and zero volt voltages.

Translator circuit 146 can be used to make a voltage conversion. Circuit 146 includes a comparator 160, resistors 162 through 168, and schottky diode 170. The circuit 146 can be used to convert the output levels $V_0$ of the slope detector into digital one and digital zero voltages, corresponding to the binary output voltage of FIG. 15.

Alternately, improved tracking can be achieved in the system 140 by open circuiting a region 18a of the conductor 18, as illustrated in FIG. 14. In this instance, a connection 18b, illustrated in phantom in FIG. 14, is provided between the resistor 60a and the output line 21a.

In connection with the previously discussed circuits, comparators can be integrated voltage comparators, type LM339AM. Operational amplifiers can be LM324AM-type integrated circuits.

It will also be understood that the present invention includes alternate processing techniques. For example and without limitation, the output 20 from the sensor 16 could be digitally processed in digital processing chips.

Figure 16:
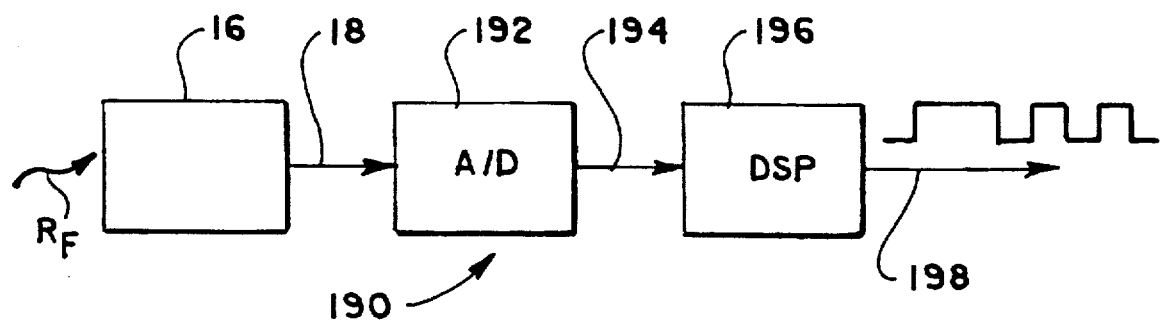
FIG. 16 is a block diagram of an alternate digital embodiment in accordance with the present invention.

FIG. 16 is a block diagram of a digital system 190 in accordance with the present invention. The digital system 190 digitizes the output signal 20 from the sensor 16 in an analog-to-digital converter 192. The digital values, on a line or lines 194, are coupled to one or more digital signal processing chips 196.

The chips are configured to digitally process the input signal 20 in accordance with the above described techniques. The output from the signal processor 196, on a line 198, is a digitized representation of the modulated analog input signal 20. The output on the line 198 corresponds to the output $V_{out}$ on the line 172 of FIG. 14, but is achieved by digital rather than analog processing.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A bar code reading apparatus, usable to generate a binary representation of an analog signal modulated by an input sequence, comprising:

a sensor for converting an input sequence to an analog signal modulated in accordance therewith;

at least one truncator circuit coupled to said sensor, for substantially eliminating noise on selected peak amplitudes of the modulated signal and for forming a smoothed representation of the analog signal;

an amplitude independent detector, coupled to said truncator circuit, for detecting at lest first and second slopes in the smoothed representation and for producing a binary representation thereof wherein a first binary value is initially produced in response to detecting a first slope and maintained until a second slope is detected.

2. An apparatus as in claim 1 wherein said slope detector includes first and second means for forming derivative signals associated with the smoothed analog signal.

3. An apparatus as in claim 2 wherein said slope detector includes a comparator coupled to said first and second means.

4. An apparatus as in claim 2 wherein each of said means includes an RC time constant circuit.

5. An apparatus as in claim 4 wherein a time constant for one of said RC circuits has a value on the order of three times that of a time constant for another of said RC circuits.

6. An apparatus as in claim 1 wherein said truncator circuit includes means for replacing noise carrying peak amplitude values with non-noisy representations thereof.

7. An apparatus as in claim 6 wherein said means for replacing includes a peak detector circuit coupled to a peak hold circuit.

8. An apparatus as in claim 7 wherein said means for replacing includes an amplifier coupled to said peak hold circuit.

* * * * *

UNITED STATES PATENT AND TRADEMARK OFFICE
CERTIFICATE OF CORRECTION

PATENT NO. : 5,536,929
DATED : July 16, 1996
INVENTOR(S) : Randal S. Butturini
Ernest W. Cooley It is certified that error appears in the above-indentified patent and that said Letters Patent is hereby corrected as shown below:

Claim 1 - Column 14, Line 56
Delete "lest" and insert therefor --least--.

Signed and Sealed this

First Day of October, 199

Attest:

BRUCE LEHMAN

Attesting Officer

Commissioner of Patents and Trademarks